United States Patent
Raya et al.

(10) Patent No.: US 10,851,669 B2
(45) Date of Patent: Dec. 1, 2020

(54) COOLING OF GAS TURBINE ENGINE ACCESSORIES USING AIR INLET LOCATED ON A KEEL BEAM

(71) Applicant: ROLLS-ROYCE plc, London (GB)

(72) Inventors: Emile Raya, Derby (GB); Lucian Ingley, Derby (GB); Zahid M. Hussain, Derby (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 16/598,369

(22) Filed: Oct. 10, 2019

(65) Prior Publication Data

US 2020/0141274 A1 May 7, 2020

(30) Foreign Application Priority Data

Nov. 1, 2018 (GB) .................................. 1817842.6

(51) Int. Cl.
| | |
|---|---|
| *F01D 25/14* | (2006.01) |
| *F02C 7/12* | (2006.01) |
| *F02K 3/06* | (2006.01) |
| *F02C 7/32* | (2006.01) |

(52) U.S. Cl.
CPC .............. *F01D 25/14* (2013.01); *F02C 7/12* (2013.01); *F02C 7/32* (2013.01); *F02K 3/06* (2013.01); *F05D 2240/14* (2013.01); *F05D 2260/201* (2013.01)

(58) Field of Classification Search
CPC .. F01D 25/12; F01D 25/14; F02C 7/32; F02C 7/18; F05D 2240/14; B64D 2033/024
See application file for complete search history.

(56) References Cited

U.S. PATENT DOCUMENTS 3,061,349 A * 10/1962 Dellith ................... B64D 29/06
                                                                                 292/304
4,525,998 A * 7/1985 Schwarz ............... F01D 25/145
                                                                                60/226.1

(Continued)

FOREIGN PATENT DOCUMENTS

| GB | 2445237 | 7/2008 |
| WO | 2015122992 | 8/2015 |

OTHER PUBLICATIONS

European Search report dated Mar. 4, 2020, issued in EP Patent Application No. 19200691.

(Continued)

*Primary Examiner* — Scott J Walthour
*Assistant Examiner* — Todd N Jordan
(74) *Attorney, Agent, or Firm* — Barnes & Thornburg LLP

(57) ABSTRACT

A gas turbine engine for an aircraft is provided. The engine includes an engine core comprising a turbine, a compressor, and a core shaft connecting the turbine to the compressor. The engine further includes core casings surrounding the engine core. The engine further includes an aerodynamic cowl which surrounds the core casings. The engine further includes a propulsive fan located upstream of the engine core, the fan generating a core airflow which enters the core engine and a bypass airflow which enters a bypass duct surrounding the aerodynamic cowl. The engine further includes one or more engine accessories mounted in a space between the core casings and the aerodynamic cowl.

11 Claims, 6 Drawing Sheets

(56) References Cited

U.S. PATENT DOCUMENTS

| | | | |
|---|---|---|---|
| 5,012,639 A * | 5/1991 | Ream | F02C 7/14 |
| | | | 60/226.1 |
| 5,269,135 A | 12/1993 | Vermejan et al. | |
| 6,202,403 B1 * | 3/2001 | Laborie | B64D 33/08 |
| | | | 60/39.83 |
| 10,443,429 B2 * | 10/2019 | Suciu | F02C 3/04 |
| 2009/0297342 A1 * | 12/2009 | Laborie | F02C 7/28 |
| | | | 415/177 |
| 2011/0239660 A1 * | 10/2011 | Suciu | F01D 15/12 |
| | | | 60/784 |
| 2013/0047623 A1 | 2/2013 | Suciu et al. | |
| 2016/0040601 A1 * | 2/2016 | Frost | F02C 7/36 |
| | | | 415/122.1 |
| 2019/0061966 A1 * | 2/2019 | West | B64D 29/06 |

OTHER PUBLICATIONS

Great Britian search report dated Apr. 26, 2019, issued in GB Patent Application No. 1817842.6.

* cited by examiner

COOLING OF GAS TURBINE ENGINE ACCESSORIES USING AIR INLET LOCATED ON A KEEL BEAM

CROSS-REFERENCE TO RELATED APPLICATIONS

This application is based upon and claims the benefit of priority from United Kingdom Patent Application No. GB 1817842.6, filed on 1 Nov. 2018, which is hereby incorporated herein in its entirety.

BACKGROUND

Technical Field

The present disclosure relates to cooling of engine accessories of a gas turbine engine.

Description of the Related Art

Conventionally the accessory gearbox of an aircraft gas turbine engine is mounted within the outer engine nacelle in a location beneath the engine. The gearbox is connected to the engine core by a radial drive shaft. The gearbox provides power to other accessories such as an auxiliary generator and pumps for hydraulic fluid, fuel, oil etc.

Although effective in that the gearbox is kept away from the hot environment of the engine core, the location of the gearbox within the outer nacelle is disadvantageous in that it requires a relatively significant amount of space within the nacelle, which can increase the overall diameter of the nacelle, leading to weight and drag increase and adverse specific fuel consumption.

In alternative arrangements, it is possible to locate the accessory gearbox and other accessories in an engine zone directly outside the casings which surround the engine core. The accessories are mounted to the casings by brackets, short spars or bosses. However, the high temperature environment near the engine core can produce thermal loads which can reduce component reliability. For example, in some engines the zone can operate at air temperatures above 300° C., which is above the thermal capability of many accessory gearbox materials. Therefore to maintain acceptable surrounding air temperatures for the gearbox, a ventilation system may be installed.

SUMMARY

The present disclosure is at least partly based on a realisation that a possible source of cooling air in turbofan engines is the bypass airflow through the bypass duct of the engine. This airflow is typically at temperatures below 100°. One option, therefore, is to form simple ventilation holes in the aerodynamic cowl which surrounds the engine zone so that a small portion of the bypass airflow enters the zone to surround the accessory gearbox. However, in high bypass ratio engines, particularly at low engine power conditions, a low fan pressure ratio reduces the pressure difference across the ventilation holes and thereby limits the amount of the bypass flow that can be diverted in this way to cool the gearbox. This in turn limits the capability of the ventilation system.

Thus according to a first aspect there is provided a gas turbine engine for an aircraft, the engine including:

an engine core comprising a turbine, a compressor, and a core shaft connecting the turbine to the compressor;

core casings surrounding the engine core;

an aerodynamic cowl which surrounds the core casings;

a propulsive fan located upstream of the engine core, the fan generating a core airflow which enters the core engine and a bypass airflow which enters a bypass duct surrounding the aerodynamic cowl; and one or more engine accessories mounted in a space between the core casings and the aerodynamic cowl;

wherein the gas turbine engine further includes:

one or more ventilation inlets which receive a portion of the bypass airflow as a cooling flow for the engine accessories, the ventilation inlets being configured to convert at least a portion of the kinetic energy of the bypass flow received therein into a pressure rise such that the pressure of the cooling flow is increased relative to the pressure of the bypass airflow; and a manifold in fluid communication with the ventilation inlets to collect the cooling flow therefrom, the manifold having plural exhaust holes therefrom through which the cooling flow leaves the manifold to impinge upon and thereby cool the engine accessories.

Advantageously, by increasing the pressure of the cooling flow in this way, and directing it to where it is needed using the exhaust holes of the manifold, the problem of a low fan pressure ratio can be overcome such that even at low engine power conditions sufficient cooling of the engine accessories can be achieved.

Optional features of the present disclosure will now be set out. These are applicable singly or in any combination with any aspect of the present disclosure.

The one or more ventilation inlets may convert at least 50% of the kinetic energy of the portion of the bypass airflow received therein into a pressure rise. Preferably they may substantially stagnate the portion of the bypass airflow received therein.

The gas turbine engine may further include a control unit which is operable to regulate the amount of cooling flow collected by the manifold from the ventilation inlets. In this way, the amount of cooling flow can be adapted to different flight conditions, reducing losses and improving engine efficiency. For example, the control unit can be under the control of an engine electronic controller (EEC) which manages the operation of the engine as a whole. In contrast, simple ventilation holes formed in the aerodynamic cowl would not allow the amount of cooling flow to be adapted in this way so that, for example, holes sized for the maximum power take-off condition where the engine core operating temperatures are at their highest would tend to provide larger than necessary ventilation flows at engine cruise, negatively impacting the performance of the engine and increasing the engine specific fuel consumption.

The exhaust holes may be arranged such that the cooling flow impinging upon the engine accessories forms a continuous film of cooling air around the accessories.

Conveniently, the exhaust holes may be formed into two lines which extend substantially parallel to the principal rotation axis of the engine to opposite sides of the engine accessories.

The one or more engine accessories may be mounted vertically beneath the core casings.

The one or more engine accessories may include an engine accessory gearbox driven by a take-off (e.g. radial drive shaft) from the core shaft. Other of the engine accessories can include, for example, any one or more of an electrical power generator, a fuel pump, an oil pump, a hydraulic pump, and an engine starter motor.

The engine accessory gearbox may include a train of spur gears which transfer the drive to other engine accessories, the spur gears being arranged in a line and having axes of rotation which extend perpendicularly to the principal rotation axis of the engine. For example, the spur gears of the train may be arranged in a line with their axes of rotation extending perpendicularly to the engine's principal rotation axis. In particular, the line may extend in a direction which is substantially parallel with the engine axis. This is in contrast with many conventional engine accessory gearboxes, where the train of spur gears extend around a circumferential direction of the engine. The train of spur gears may be mounted along a central spine member, the other engine accessories projecting from opposite sides of the spine member.

The gas turbine engine may further include a circumferential row of outer guide vanes located in the bypass duct rearwards of the propulsive fan, the outer guide vanes extending radially outwardly from an inner ring which defines a radially inner surface of the bypass duct. The aerodynamic cowl can then be rearwards of the inner ring and can include two door sections located on respective and opposite sides of the engine, each door section being pivotably openable about an upper edge thereof to enable maintenance access to the engine core, and the aerodynamic cowl can further include a keel beam which extends rearwardly from the inner ring at bottom dead centre thereof to provide latching formations for latching to a lower edge of each door section when it is closed. Conveniently, in such an arrangement, the ventilation inlets may be located on the radially outer surface of the keel beam. The manifold may be located on the radially inner surface of the keel beam. The keel beam, as well as providing a convenient location for the ventilation inlets and/or manifold, allows the lower edges of the door sections to be located away from bottom dead centre where core engine liquids are most likely to accumulate. Instead these liquids can be guided and drained by appropriate shaping of the inner surface of the keel beam. Also, the keel beam can provide a relative rigid structure for sealing to the lower edges of the door sections, thereby improving these seals and hence the fire zone boundary performance between core and bypass zones of the engine.

The gas turbine engine may further include a power gearbox that receives an input from the core shaft and outputs drive to the propulsive fan so as to drive the fan at a lower rotational speed than the core shaft.

The turbine may be a first turbine, the compressor may be a first compressor, and the core shaft may be a first core shaft. The engine core may then further include a second turbine, a second compressor, and a second core shaft connecting the second turbine to the second compressor. The second turbine, second compressor, and second core shaft may be arranged to rotate at a higher rotational speed than the first core shaft.

As noted elsewhere herein, arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade.

Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
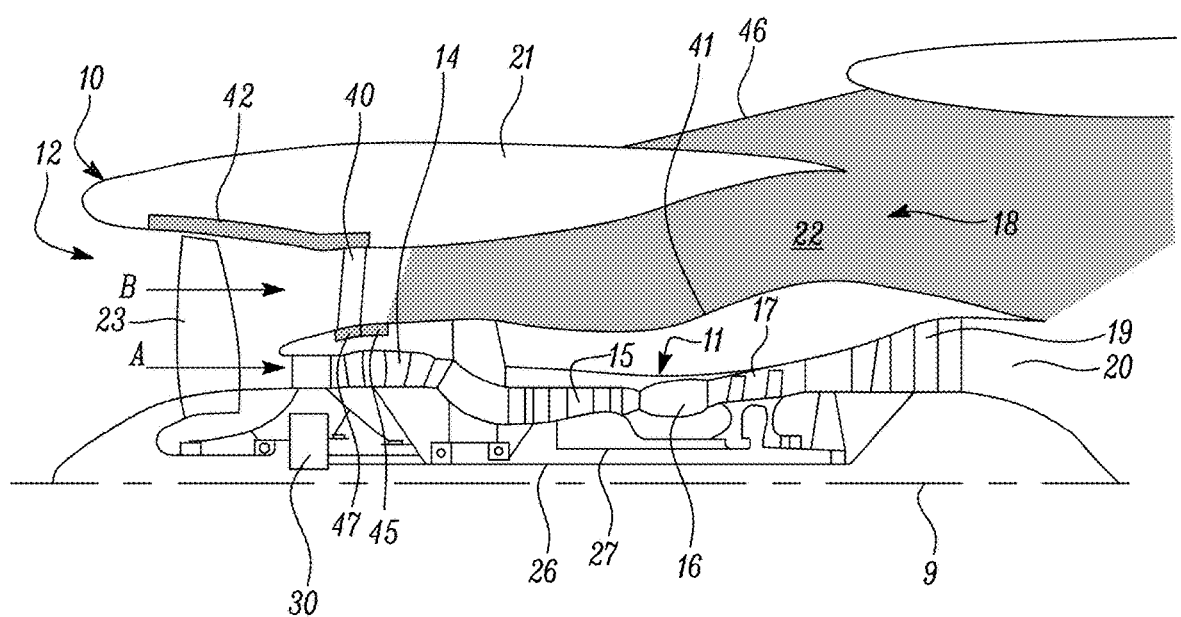
FIG. 1 is a sectional side view of a gas turbine engine.

FIG. 1 illustrates a gas turbine engine 10 having a principal rotational axis 9. The engine is mounted to an airframe, e.g. under a wing, by a mounting pylon 46. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The pylon 46 forms a bifurcation in the bypass duct where it traverses the duct to join to the engine core 11. The bypass airflow B flows through the bypass duct 22, where it is straightened by a row of outer guide vanes 40 before exiting the bypass exhaust nozzle 18. Rearward of the outer guide vanes 40, the engine core 10 is surrounded by an inner cowl 41 which provides an aerodynamic fairing defining an inner surface of the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
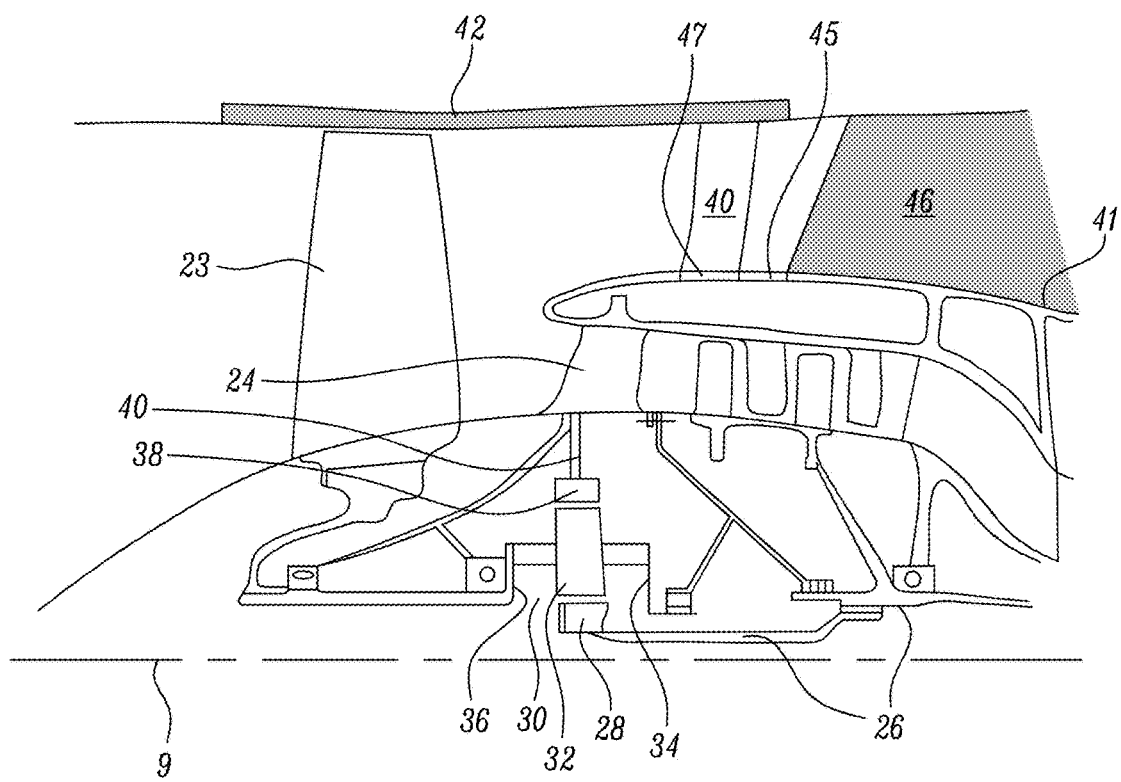
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
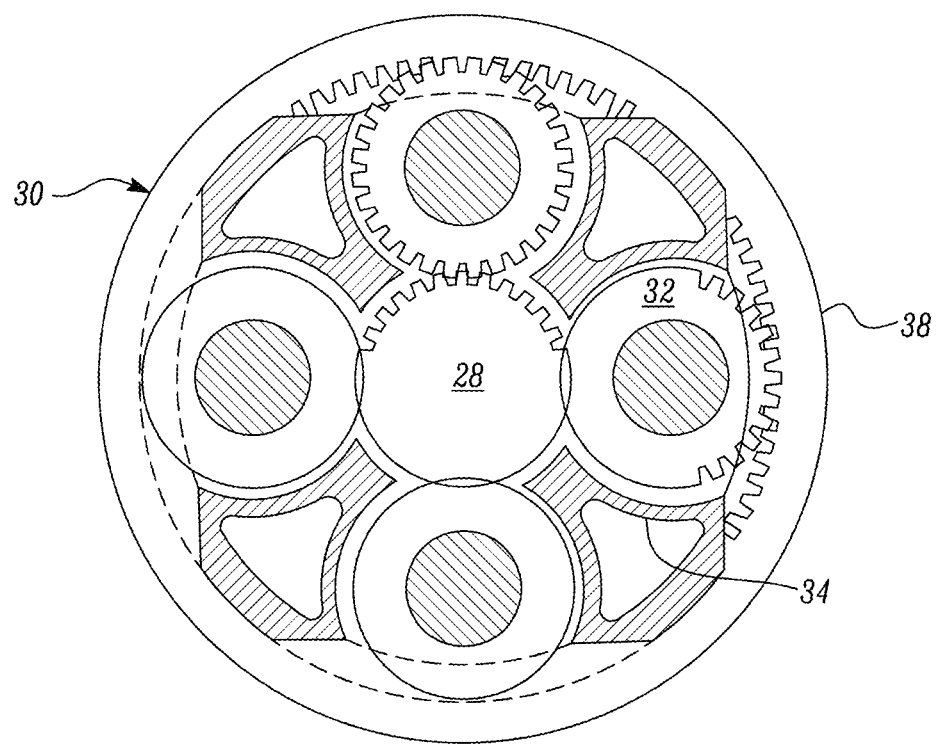
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
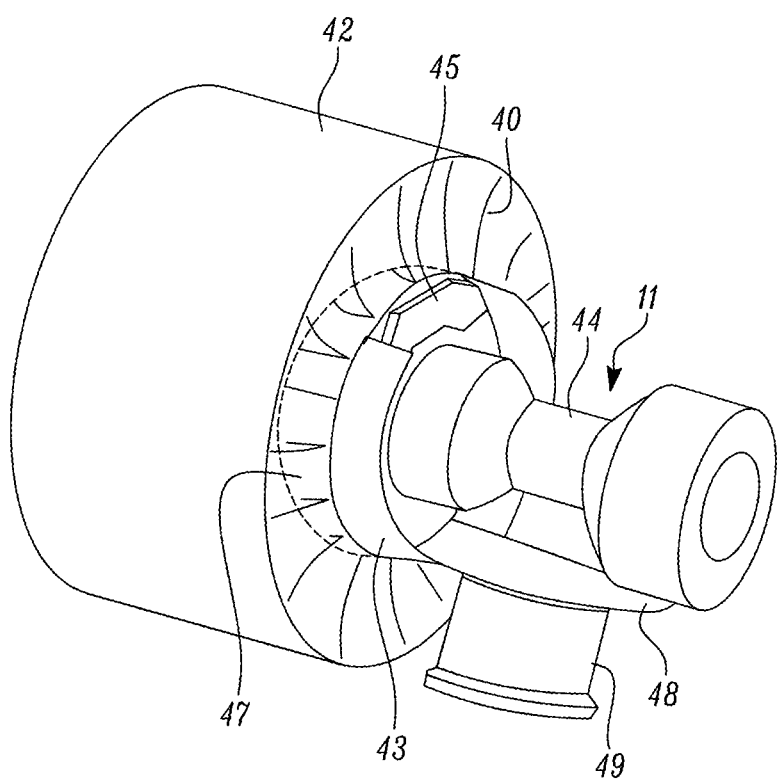
FIG. 4 shows schematically a perspective view from the rear of an engine without its nacelle and without most of its inner cowl.

FIG. 4 shows schematically a perspective view from the rear of the engine 10 with the nacelle 21, most of the inner cowl 41 and the pylon 46 removed. A fan case 42 defines an outer surface of the bypass duct 22 and towards the rear of the fan case an inner ring 47 defines an inner surface of the bypass duct 22. The outer guide vanes 40 extend radially from the inner ring to the fan case, and the engine core 11 projects rearwardly from the plane of the outer guide vanes. A fixture 45 located at top dead centre behind the inner ring provides a connection point for the mounting pylon 46 which mounts the engine to the airframe.

Figure 5:
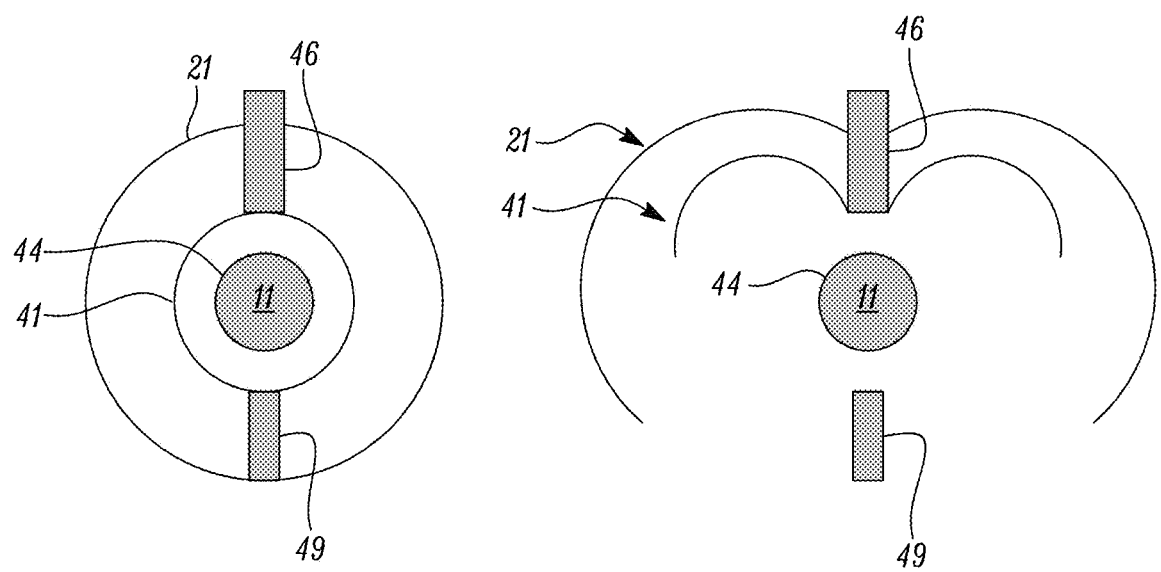
FIG. 5 shows schematically at left a transverse cross-section through the engine of FIG. 4 when door sections of its inner cowl are closed, and at right a transverse cross-section through the engine when these door sections are swung open.

The inner cowl 41 includes two door sections, one on either side of the engine 10, with each door section being pivotably openable about a respective pivot line which extends from front to back along that door section's side of the mounting pylon 46. This allows the door sections to be swung upwards and away from the engine core 11 for maintenance access. Conveniently, the top edges of the door sections can form the pivot lines. FIG. 5 shows schematically at left a transverse cross-section through the engine when the door sections of the inner cowl 41 are closed (and also door sections of the nacelle 21 surrounding the fan case 42 are closed), and at right a transverse cross-section through the engine when these door sections are swung open.

Returning to FIG. 4, a two-part inner barrel 43 attached to the inner ring 47 bridges the space between the inner ring and the inner cowl, and provides circumferentially extending V-grooves at its rear edge for engaging the front edges of the door sections when they are closed. In addition, a keel beam 48 extends rearwardly from bottom dead centre of the inner ring 47 to provide latching formations for latching to lower edges of the door sections when they are closed. The keel beam 48 can have one or more cut-out drain holes (not shown) to provide core zone liquid drainage, and a profiled drainage guidance surface to provide a positive drainage force via gravity to the drain holes.

A lower splitter 49 may also traverse the bypass duct, and conveniently, the keel beam can then form an interface for mounting a radially inner end of the lower splitter. This mounting arrangement is advantageous when the engine has a large volume of core-mounted accessories in the space between the engine core and the keel beam such that a direct mount of the lower splitter to a casing of the engine core is impractical. The lower splitter can be fastened to the keel beam by a straightforward bolting arrangement positioned where the components are in contact.

Figure 6:
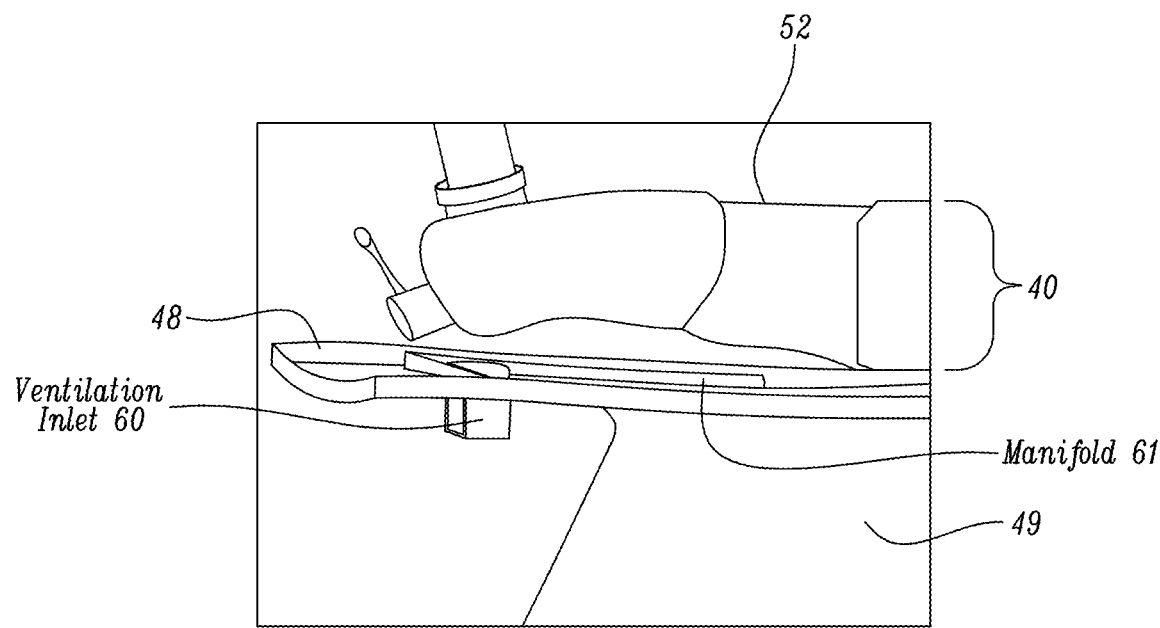
FIG. 6 shows a side perspective view of front end portions of a keel beam and lower splitter of the engine of FIG. 4.
Figure 7:
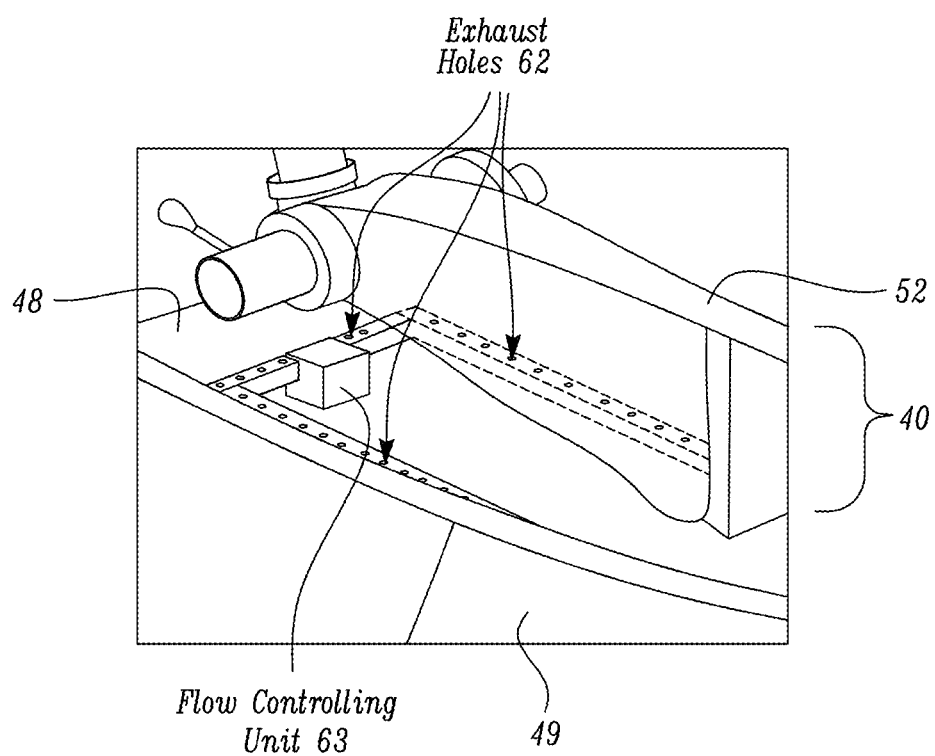
FIG. 7 shows a top perspective view of the front end portions of the keel beam and lower splitter of the engine of FIG. 4.

FIGS. 6 and 7 show side and top perspective views of front end portions of the keel beam 48 and lower splitter 49. They also show engine accessories 40 (drawn semi-transparently in FIGS. 6 and 7) which are located above the keel beam within an engine zone bounded on a radially outer side by the inner cowl 41, and on a radially inner side by core casings 44 of the engine core 11. The engine accessories 40 include an accessory gearbox driven by a take-off (such as a radial drive shaft—not shown) from the core shaft 26. Other accessories may include any one or more of a power generator, a fuel pump, an oil pump, a hydraulic pump, and an engine starter motor. The engine accessory gearbox has a front end that receives the drive from the drive shaft 26 and has a train of spur gears which transfer the drive to the other accessories. These spur gears are arranged in a line along a central spine member 52, with the other accessories projecting from opposite sides of the spine member. The central spine member extends substantially parallel to the engine axis 9 with the rotation axes of the spur gears perpendicular to the engine axis.

The engine zone in which the engine accessories 40 are located can reach air temperatures above 300° C. Thus a ventilation system is provided to maintain engine accessories within acceptable thermal limits. This system is located on the keel beam 48 and comprises a ventilation inlet 60 which faces forwards at engine bottom dead centre in the bypass duct 22 to receive a portion of the relatively low temperature (<100° C.) bypass airflow B as a cooling flow for the accessories. Kinetic energy of the received bypass flow is converted at the inlet into an increased pressure of the cooling flow, whereby the cooling flow has a pressure differential relative to air pressure in the engine zone which is sufficient to keep the accessories ventilated even at low engine power conditions. To direct the cooling flow where it is needed, the ventilation system further comprises a manifold 61 located on the radially inner surface of the keel beam in fluid communication with the ventilation inlet to collect the cooling flow therefrom. The cooling flow leaves the manifold through plural exhaust holes 62 to impinge upon and extract heat from the engine accessories, protecting the accessories from the heat present in the engine zone. For example, the manifold and its exhaust holes can be configured as shown so that the holes form two lines which extend substantially parallel to the engine axis 9 to opposite sides of the accessories. In this way, the cooling air can be exhausted at high velocities over the full length of the engine accessories 40.

Optionally, the ventilation system also comprises a control unit 63 which is under the control of the engine's EEC, and which regulates the amount of cooling flow required to ventilate the engine accessories 40 at different flight conditions thereby modulating and optimising the cooling flow at different flight conditions, to reduce its impact on engine performance and specific fuel consumption. Conveniently, the control unit can be located between the inlet 60 and the manifold 61 to mediate transfer of the cooling flow therebetween. However, particularly if regulation of the cooling flow has a little impact on engine performance, the control unit can be omitted to reduce weight and complexity of the ventilation system.

Figure 8:
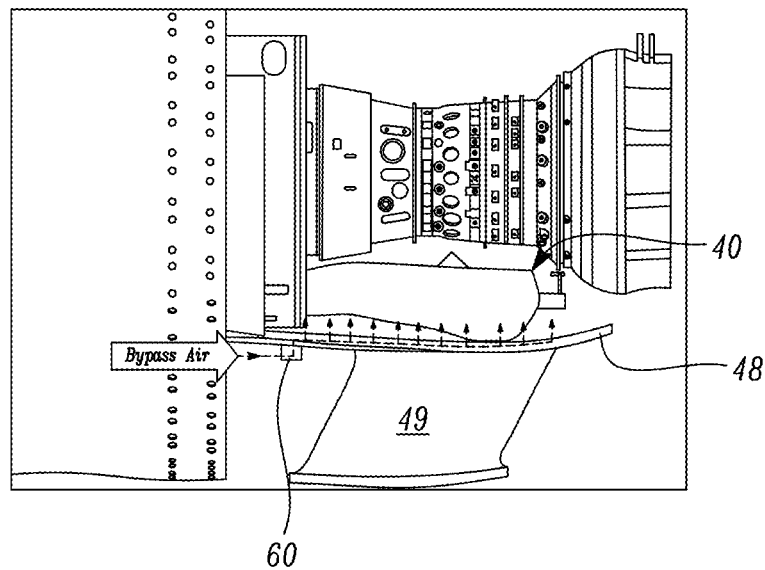
FIG. 8 shows a cooling flow on a schematic side view of the engine without its nacelle and without most of the inner cowl.
Figure 9:
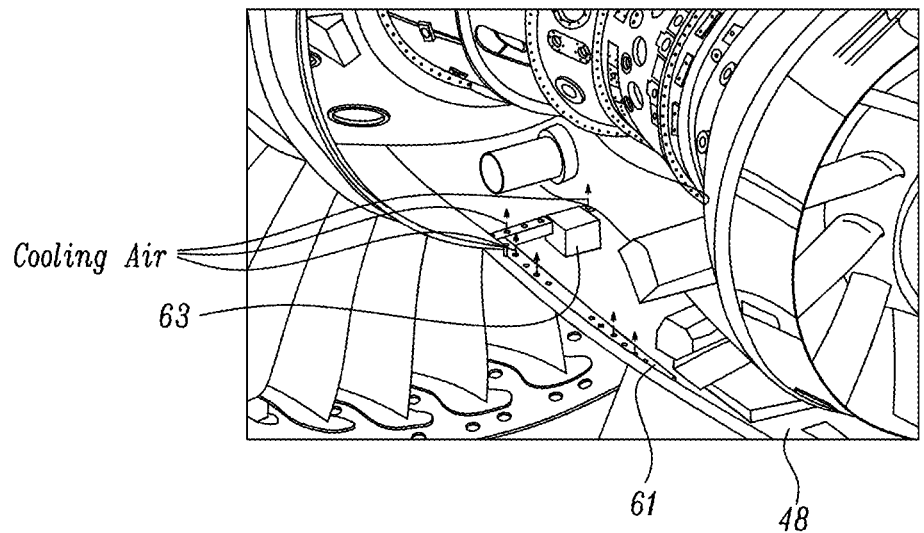
FIG. 9 shows the cooling flow on a perspective view looking down on to the keel beam of the engine.

FIG. 8 shows a schematic side view of the engine with the nacelle 21, most of the inner cowl 41 and the pylon 46 removed, and FIG. 9 shows a perspective view looking down on to the keel beam 48. The bypass airflow B received into the inlet 60, and the cooling flow through the manifold 61 and out of the exhaust holes 62 are indicated by arrowed lines and illustrate how the cooling flow surrounds the engine accessories 40 in a continuous film of cooled air.

The ventilation inlet 60 takes advantage of the dynamic head of the bypass airflow B to generate a sufficient driving force for the flow to travel through the control unit 63 and the manifold 61. For example, the ventilation inlet can be a total pressure inlet, e.g. converting at least 50% of the kinetic energy of the received bypass airflow into a pressure rise, and preferably substantially stagnating the received bypass airflow.

Although shown in FIGS. 6 to 9 with just one ventilation inlet 60, the ventilation system may have plural inlets. Additionally, or alternatively, the inlet or inlets can be located elsewhere, such as on the lower splitter 49.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft, the engine including:
   an engine core comprising a turbine, a compressor, and a core shaft, the core shaft connecting the turbine to the compressor;
   core casings surrounding the engine core;
   an aerodynamic cowl which surrounds the core casings;
   a propulsive fan located upstream of the engine core, the fan configured to generate a core airflow which enters the engine core and a bypass airflow which enters a bypass duct surrounding the aerodynamic cowl; and an engine accessory mounted in a space between the core casings and the aerodynamic cowl;

a circumferential row of outer guide vanes located in the bypass duct rearwards of the propulsive fan, the outer guide vanes extending radially outwardly from an inner ring, the inner ring defining a radially inner surface of the bypass duct;

a fixture located rearwardly from the inner ring, wherein the fixture provides a connection point for a mounting pylon, wherein the aerodynamic cowl is rearwards of the inner ring and includes a first door section and a second door section, wherein the first door section and the second door section are located on respective and opposite sides of the gas turbine engine, each door section being pivotably openable about a respective upper edge thereof to enable maintenance access to the engine core, the aerodynamic cowl further including a keel beam which extends rearwardly from the inner ring, wherein the keel beam is diametrically opposed to the fixture, wherein the keel beam provides latching formations for latching to a first lower edge of the first door section and a second lower edge of the second door section when the respective door sections are closed;

wherein the gas turbine engine further includes:

a ventilation inlet located on a radially outer surface of the keel beam to receive a portion of the bypass airflow as a cooling flow for the engine accessory, the ventilation inlet being configured to convert a portion of kinetic energy of the bypass flow received therein into a pressure rise such that the pressure of the cooling flow is increased relative to the pressure of the bypass airflow; and a manifold in fluid communication with the ventilation inlet to collect the cooling flow therefrom, the manifold having a plurality of exhaust holes through which the cooling flow leaves the manifold to impinge upon and thereby cool the engine accessory.

2. The gas turbine engine according to claim 1, wherein the ventilation inlet is configured to convert at least 50% of the kinetic energy of the portion of the bypass airflow received therein into the pressure rise.

3. The gas turbine engine according to claim 1, wherein the plurality of exhaust holes are arranged and configured such that the cooling flow impinging upon the engine accessory forms a continuous film of cooling air around the engine accessory.

4. The gas turbine engine according to claim 1, wherein the plurality of exhaust holes are formed into two lines which extend substantially parallel to a principal rotation axis of the core shaft, wherein the two lines are on respective opposite sides of the engine accessory.

5. The gas turbine engine according to claim 1, wherein the engine accessory is mounted to the core casings opposite the fixture.

6. The gas turbine engine according to claim 1, wherein the engine accessory is an engine accessory gearbox configured to be driven by a take-off from the core shaft.

7. The gas turbine engine according to claim 6, wherein the engine accessory gearbox includes a train of spur gears which are configured to drive a second engine accessory, the spur gears being arranged in a line and having axes of rotation which extend perpendicularly to a principal rotation axis of the core shaft.

8. The gas turbine engine according to claim 7, wherein the train of spur gears is mounted along a central spine member, the second engine accessory projecting from a side of the central spine member.

9. The gas turbine engine according to claim 1, wherein the manifold is located on a radially inner surface of the keel beam.

10. The gas turbine engine according to claim 1, further including a power gearbox that receives an input from the core shaft and is configured to drive the propulsive fan at a lower rotational speed than the core shaft.

11. The gas turbine engine according to claim 1, wherein:
the turbine is a first turbine, the compressor is a first compressor, and the core shaft is a first core shaft;
the engine core further comprises a second turbine, a second compressor, and a second core shaft, the second core shaft connecting the second turbine to the second compressor; and
the second turbine, the second compressor, and the second core shaft are arranged to rotate at a higher rotational speed than the first core shaft.

* * * * *